Aug. 24, 1926.  1,597,057
F. T. COURT
LOCKING AND RELEASING LEVER
Filed Feb. 26, 1926
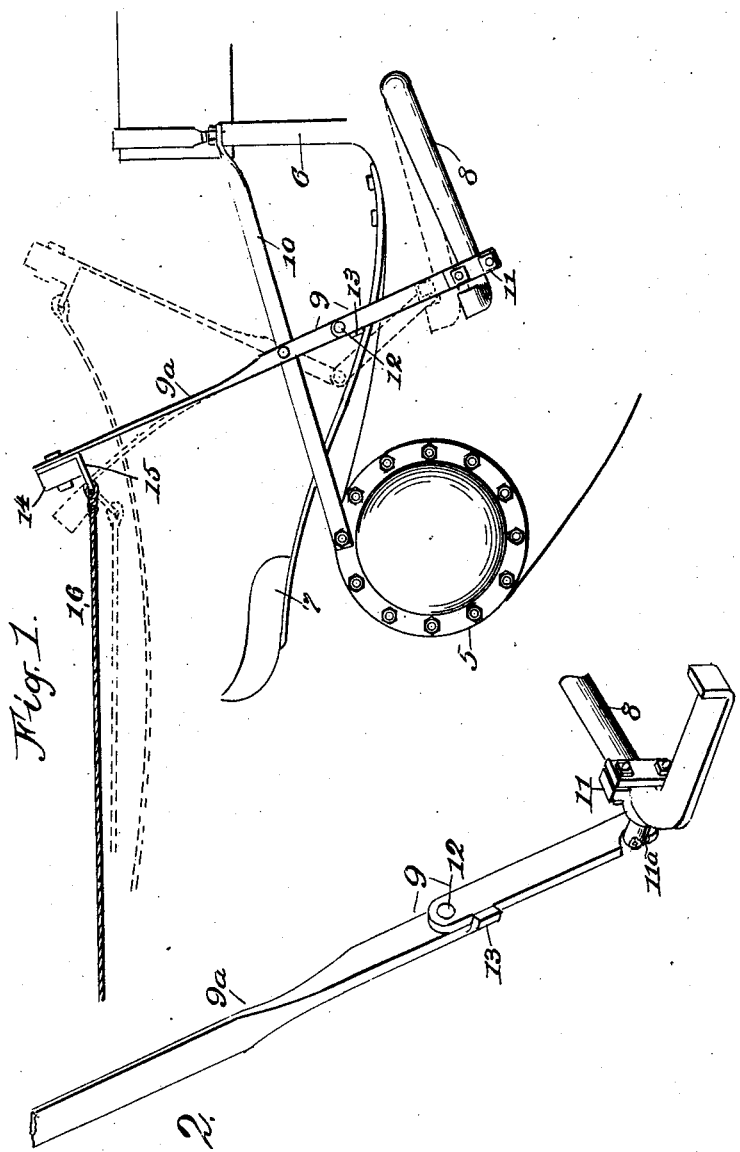

Patented Aug. 24, 1926.

1,597,057

UNITED STATES PATENT OFFICE.

FRANK T. COURT, OF INDEPENDENCE, IOWA.

LOCKING AND RELEASING LEVER.

Application filed February 26, 1926. Serial No. 90,793.

This invention relates to a lever used to hold an independently movable body locked in a final position, and more particularly a lever operable from a distance to hold a motor vehicle clutch disengaged, and by release from such position to permit the engagement of the clutch.

The object of this invention is to provide a device by means of which this double operation may be effected by the positive movement of the lever in but one direction, the releasing movement being effected by the recoil of the lever when suddenly released.

The invention is fully disclosed in the description and claims following, reference being had to the accompanying drawing, in which:

Fig. 1 is a side elevation of a device embodying my invention. Fig. 2 shows the control mechanism in perspective.

The device is herein shown as applied to a tractor of a familiar type, of which the numeral 5 denotes the crank-case; 6 the dash; 7 the driver's seat, and 8 the foot-lever which controls the main clutch (not shown). It is to be understood that depressing this foot lever releases the clutch, and removing the foot-pressure serves to engage the clutch by virtue of its own mechanism, and in a well known manner. When there is but one operator, and he is needed at a machine trailing the tractor, he must necessarily control its movements, as he would a team of horses, by means of "lines", that is to say, cords or cables connecting with the tractor in such a way that pulling the various cords will control the tractor as desired. The control of the clutch naturally calls for two cords, adapted for pulling in opposite directions, since it is quite necessary, when the clutch is released, to lock it, and thus prevent any accidental starting of the tractor. Once locked, it must of course be unlocked in order to start the tractor, and this naturally involves a releasing pull of some sort. The mechanism now to be described dispenses with the need of a second pulling device, the cost of which is insignificant compared with the inconvenience of handling another cord, when so many are needed for other operations.

The application of the apparatus to the tractor is shown conventionally. It comprises mainly a toggle-lever 9, a stable support therefor, herein shown as a bar 10 secured at one end to the crank-case and at the other end to the dash, and a pivotal connection of the lower end of the lever with the tractor foot-lever above mentioned. The support for the lever will vary with different tractors, depending on the availability of bolts by which it may be fastened to the tractor. That herein shown is of the simplest type, and may serve to illustrate the invention, its particular shape or location not being very important. A simple pivot for the lower end of the lever is shown as a clip 11 with a stud 11ª to engage the lever, a part of which is broken away to show the stud. The lever adapted to lock when in line, being pivoted at 12 and provided with a stop-lug 13 to limit its movement in one direction.

The long arm of the lever is formed as a rather stiff spring 9ª, that is to say, stiff enough to actuate the toggle so as to depress the foot-lever, but yielding considerably to a forcible pull. To the free end of this flexible part of the lever is attached a weight 14, and near it, as to a bracket or lug 15 is attached the pull-cord 16.

The operation of the device is clearly indicated by the full outlines and dotted lines in Fig. 1. In the position shown in full, the foot-lever is shown depressed (the clutch-releasing position). To disengage the lever, which is locked, as shown, the operator pulls back sharply on the cord, bending the lever back as shown. On suddenly releasing the cord, the spring whips forwardly, and its momentum, aided by the weight, breaks the locked joint, and the foot-lever is automatically released, thus engaging the clutch by its own internal mechanism, as above set forth.

Having thus described my invention, I claim:

1. A locking lever for an independently movable body, having means to engage said body and lock it in a final position, and a stop to arrest the movement of the lever at said final position, the body of the lever being resilient whereby it may be flexed against said stop, and when suddenly released may disengage the lock and liberate the movable body by its recoil.

2. A locking lever for an independently movable body, having means to engage said body and lock it in a final position, a stop to arrest the movement of the lever in said final position, and a weight carried by said lever, the body of the lever being resilient, whereby the recoil of the lever, augmented by the weight, disengages said movable body when the lever is flexed against the stop and suddenly released.

3. The combination with an independently movable body, of a resilient lever, a weight carried thereby, a stop for the lever in a final position, means for holding the lever in said final position, and pulling means attached to the resilient part of the lever, whereby it may be flexed against said stop, and when suddenly released may disengage the movable body by the recoil of the lever.

4. The combination with the disengaging lever of a motor vehicle clutch, of a resilient lever, a pivotal support therefor, a link connecting said two levers, a stop to limit the movement of the resilient lever in a locked position, and pulling means, whereby the resilient lever may be bent back against the stop, and spring forward when released, to disengage the locked parts.

5. The combination with the disengaging member of a motor vehicle, of a resilient lever, a pivotal support therefor, a link connecting said lever and clutch member, a stop to limit the movement of the lever in a locked position, a weight carried by said lever, and pulling means attached to the lever.

In testimony whereof I affix my signature.

FRANK T. COURT.